United States Patent [19]

Gambino

[11] 3,862,857

[45] Jan. 28, 1975

[54] METHOD FOR MAKING AMORPHOUS SEMICONDUCTOR THIN FILMS

[75] Inventor: Richard J. Gambino, York Town Heights, N.Y.

[73] Assignee: International Business Machines Corporation, Armonk, N.Y.

[22] Filed: Dec. 26, 1972

[21] Appl. No.: 318,329

[52] U.S. Cl........... 117/201, 117/106 R, 117/106 A

[51] Int. Cl........... H01b 13/06

[58] Field of Search............ 117/201, 106 R, 106 A

[56] References Cited

UNITED STATES PATENTS

| | | | |
|---|---|---|---|
| 3,472,685 | 10/1969 | Marfainc et al. | 117/201 |
| 3,476,592 | 11/1969 | Berkenbut et al. | 117/106 A |
| 3,615,931 | 10/1971 | Arthur, Jr. | 117/106 A |

*Primary Examiner*—Mayer Weinblatt
*Attorney, Agent, or Firm*—Isidore Match; Hansel L. McGee

[57] ABSTRACT

A method for providing an amorphous semicondcutor material thin film on a substrate member is described. In carrying out the method, there are disposed in spaced relationship in an evacuated chamber, a surface of a body of the semiconductor material which contains the constituents of the desired thin film in substantially stoichiometric proportion, the body being substantially uniform in thickness and in composition, and a surface of the substrate member. The distance between the two surfaces is chosen to be no greater than the shortest dimension of the surface of the semiconductor body, the area of the latter surface being chosen to be at least equal to the area of the surface of the substrate member. The semiconductor material contains semiconductor components, each of which has a high enough vapor pressure at a temperature less than its melting point to meet the criterion wherein the ratio $P/(MT_m)^{1/2}$, wherein P is the vapor pressure in Torr, M and $T_m$ are molecular weight and melting points (in degrees Kelvin), respectively, has a value of at least $0.855 \times 10^{-8}$. The surface of the semiconductor material body is uniformly heated to a temperature close to but less than its melting point to cause the semiconductor material thereof to evaporate therefrom onto the surface of the substrate member and to deposit on the substrate member's surface as an amorphous film. In the situation wherein it is desired to deposit an amorphous semiconductor material thin film wherein the vapor pressure of one of the constituents is not sufficiently high at a temperature less than its melting point to meet the above-mentioned ratio criterion, then, in the method, those components which have a sufficiently high vapor pressure at temperatures below their melting points to meet the criterion are combined in the desired stoichiometric proportions in a single semiconductor material body to provide a first sublimation source and those components which do not have sufficiently high vapor pressures at temperatures below the melting point of the semiconductor material to meet the above set forth ratio criterion function as separate sublimation sources. In this situation, the surface of the semiconductor body having the sufficiently high vapor pressure components is heated to a temperature close to but less than its melting point as in the single source method, and the sublimation sources comprising the low vapor pressure semiconductor constituents are positioned close to and adjacent to the first source, the latter sources being heated whereby their deposition rates onto the substrate are at the amounts required to provide their stoichiometric proportions in the thin film deposited on the substrate.

7 Claims, 6 Drawing Figures

METHOD FOR MAKING AMORPHOUS SEMICONDUCTOR THIN FILMS

BACKGROUND OF THE INVENTION

This invention relates to amorphous semiconductor thin films. More particularly, it relates to a novel method for providing improved thin films of amorphous semiconductors.

With the progressively increasing importance of thin films of amorphous semiconductors such as, for example, in laser beam writing, photoconductivity, electrostatic reproduction, electrically alterable switching devices and the like, a need has concomitantly arisen for providing such films with controlled compositions. Since the useful properties of these films often depend critically upon their compositions, it has become necessary to have a reliable method for producing such thin films with controlled compositions.

In this latter connection, the constituents of amorphous semiconductors such as those of the chalcogenide type frequently have different vapor pressures. Consequently, conventional vaor deposition methods therefor generally produce a film with an undesirable composition gradient throughout the thickness of the film. Furthermore, these conventional vapor deposition methods produce films wherein there is considerable variability in composition from film to film although the different films are prepared under the same nominal conditions.

In addition to the use of vapor deposition techniques for producing thin films of amorphous semiconductors, there have been employed for this purpose techniques such as sputtering, flash evaporation, and multisource evaporation. However, as in conventional vapor deposition, the films which are produced by these latter techniques have undesirable composition gradients throughout the thickness of the films and/or variability in composition from film to film.

Another problem which is encountered in the fabrication of amorphous semiconductor thin films is the sensitivity of the semiconductors constituted thereby to heat. Such sensitivity renders it substantially impossible to effectively homogenize thin films by annealing after their deposition or to use heated substrates to preferentially adjust the sticking coefficients of the film's constituents.

Accordingly, it is an important object of this invention to provide a method for fabricating amorphous semiconductor thin films wherein there are substantially no compositional variations.

It is a further object to provide a method for fabricating amorphous semiconductor thin films which consistently produces discrete films with substantially no variability of composition therebetween.

Prior Art

In the paper of P. Huijer, W. T. Langendam and J. A. Lely, "Vacuum Deposition of Resistors," Philips Technical Review, pp. 144–149 (1962), there is disclosed the deposition of a thin film with constituents in the desired stoichiometric proportions from an evaporation source comprising such stoichiometrically proportioned constituents. However, these films are not amorphous since the authors introduce no parameters of source to substrate distance, source and substrate area sizes, substrate temperature and evaporation rate at source, i.e., source temperature.

SUMMARY OF THE INVENTION

In accordance with the invention there is provided a method for providing an amorphous semiconductor material thin film on a substrate member comprising the steps of: disposing in spaced relationship in an evacuated chamber, the surface of a body of the semiconductor material, the body containing semiconductor components of the film in desired stoichiometric proportions and being substantially uniform in thickness and composition, and a surface of the substrate member. The distance between the surfaces is chosen such that it is no greater than the shortest dimension of the surface of the semiconductor body. The area of the surface of the semiconductor body is chosen to be at least equal to the area of the surface of the substrate member. The semiconductor body material is one wherein the lowest vapor pressure component thereof has a value at a temperature below its melting point such that it meets the criterion of at least about $0.855 \times 10^{-8}$ for the ratio $P/(MT_m)^{1/2}$ wherein P is the vapor pressure in Torr of such lowest vapor pressure component and M and $T_m$ are its molecular weight and melting point (in degrees Kelvin), respectively. To effect the deposition of the amorphous thin film, the surface of the semiconductor material body is heated to a temperature close to but less than its melting point to cause the semiconductor material to evaporate therefrom onto the substrate surface as the amorphous film.

In the situation where it is desired to deposit an amorphous semiconductor material thin film wherein there are included components whose vapor pressures at temperatures below the melting point of the semiconductor material do not meet the above set forth ratio criterion, those components which do meet the criterion are combined in a semiconductor body in the desired stoichiometric proportions, the body being uniform in thickness and composition, this body functioning as a first sublimation source. Those semiconductor components which have vapor pressures at temperatures below the melting point of the material which are too low to meet the above set forth criterion serve as further sublimation sources. In the carrying out of the deposition in this case, the first sublimation source as in the single source case has its surface spaced from the substrate surface the desired distance and is heated to a temperature close to but below its melting point. The other sources, i.e., those comprising the insufficiently high vapor pressure components, are heated to temperatures such that their depositions on the substrate are at rates whereby their desired stoichiometric proportions are attained in the thin film deposited on the substrate surface. The relative areas of the two sources should be approximately proportional to the ratio of their constituents in the desired film composition. Both sources should be at approximately the same perpendicular distance from the substrate plane so that the vapor stream of one source is not blocked by the other. Examples of particularly efficacious sources are all compositions in the arsenic tellurium series containing 100 to 50 atomic percent tellurium and 0 to 50 atomic percent arsenic. Such sources prepared according to the invention have melting points in the range of 350° to 450°C whereby they are effective in the inventive method when maintained at temperatures of about 300°C up to their melting points.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
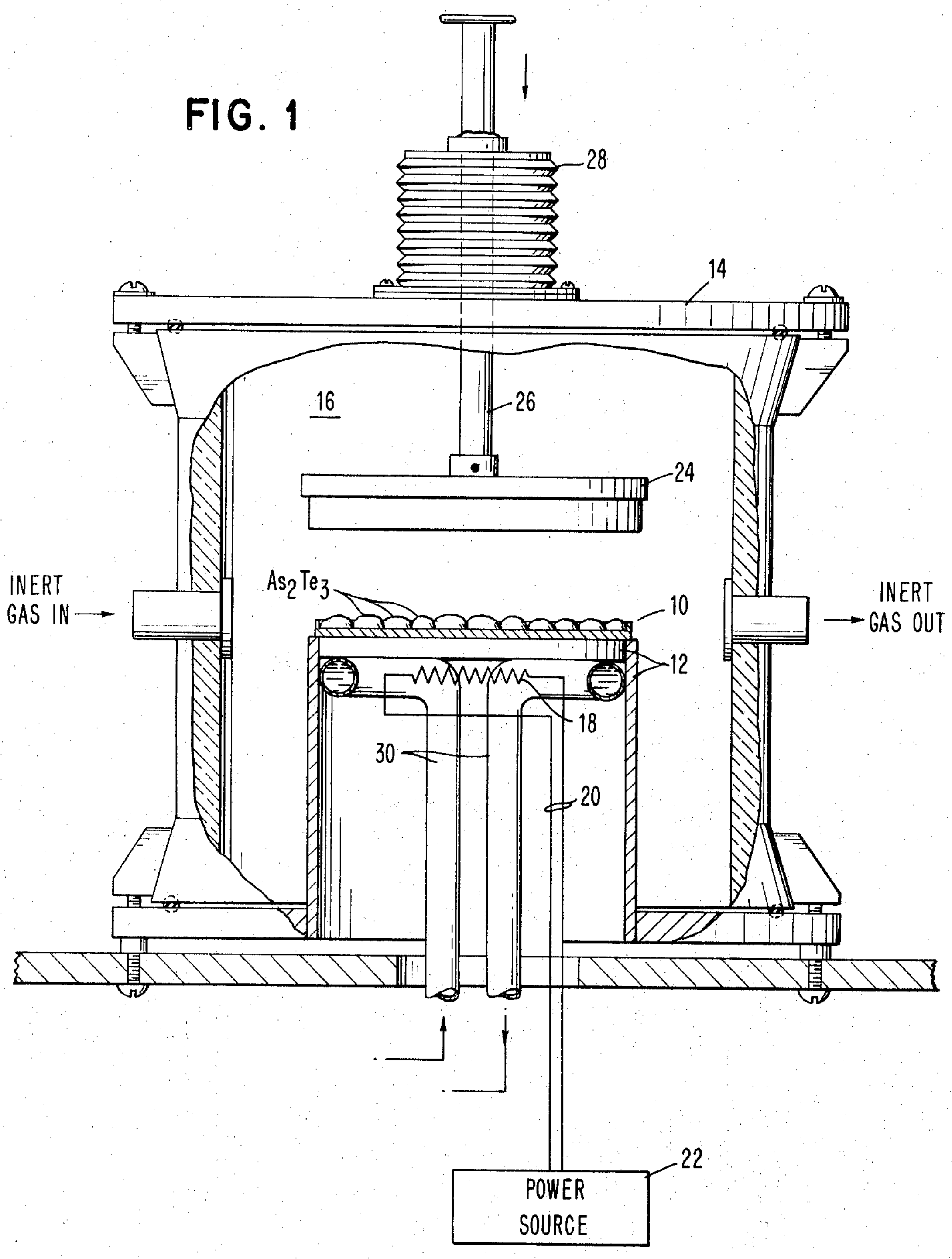
FIG. 1 is a depiction in section of an apparatus for preparing a sublimation source to be utilized in the method according to the invention.

A salient element of the method, according to the invention, to enable composition control in the deposition of thin films of amorphous semiconductors, is the use of a sublimation source for vapor deposition. This source is a solid and its use presents the advantage in that the composition of the vapor eventually reaches a steady state after some induction period. Thus, the operative mechanism of the method can be conveniently described as follows, using the example of the compound $As_2Te_3$ as the amorphous semiconductor material.

1. The more volatile constituent of the compound, i.e., As, preferentially vaporizes leaving behind a film enriched in the less volatile element of the compound, i.e., Te.

2. The rate of evaporation of As decreases because this rate of evaporation is proportional to the vapor pressure of As over the source which is approximately $P_{As} = P_{As}^{\circ} C_{As}$, where $P_{As}^{\circ}$ is the vapor pressure of pure As and $C_{As}$ is the surface concentration of As. Similarly, $P_{Te} = P_{Te}^{\circ} C_{Te}$.

3. When a steady state condition is attained, there will be a surface layer on the source which is depleted in As. In this situation, the flux of As and Te atoms leaving the surface have to be balanced by the flux of atoms entering the surface layer and the width of the surface layer has to remain constant. Thus, it is seen that the steady state is only attained, therefore, when the vapor composition is equal to the bulk composition.

Accordingly, a sublimation source in the steady state constitutes a source with a constant composition vapor stream with the vapor composition equal to the bulk composition. In order to obtain thin films which are both stoichiometric and amorphous, the following other considerations have to be dealt with.

1. The rate of deposition has to be sufficiently high to give an amorphous deposit.

2. The sticking coefficients of all of the constituents have to be unity or at least equal to each other.

3. Substrate temperature has to be maintained below some critical value for a given rate of deposition.

It has been found that the foregoing conditions can be met by utilizing the following method:

1. In order to obtain a high rate from a sublimation source, the area has to be maximized and the source-to-substrate distance has to be minimized.

2. The source has to be uniformly heated to a temperature close to, but not exceeding, its melting point. In this connection, it is to be realized that, although the source may comprise constituents of differing respective melting points, the melting point of the composite, i.e., the source, may be different from the individual constituent melting points, and generally is lower. In the method of the invention, the melting point which is finally considered is that of the composite, i.e., the source.

3. The substrates have to be heat sunk quite well and cooled in order to meet conditions of low temperature for sticking and to prevent crystallization.

There is first considered the sublimation source. The latter desirably is uniform in composition and thickness and has a surface area comparable to the area of the substrate which is to be coated. There are detailed hereinbelow methods of fabricating sublimation sources. These methods are described utilizing $As_2Te_3$ as an example of the source material.

Melt-Press Method

The compound $As_2Te_3$ is prepared by melting a mixture of 40 atomic percent As with 60 atomic percent Te in an evacuated sealed fused quartz ampule. The melt is air quenched to produce a polycrystalline ingot of the compound. This ingot is mechanically crushed to produce a large number of small particles ranging in size up to about 0.5 cm in the largest dimension. The ingot particles are spread on a stainless steel backing plate of about 3/16 inch thickness and 3 inches diameter, the plate having a depression of a 2 inch diameter and ⅛ inch depth machined thereinto.

This backing plate 10 with the $As_2Te_3$ particles therein is placed on the copper heater block 12 of the apparatus as shown in FIG. 1. The cover plate 14 of the apparatus is clamped in place to seal the pyrex glass chamber 16. Chamber 16 is then flushed with an inert gas such as nitrogen, to prevent oxidation of the $As_2Te_3$ during subsequent heating. After the air has been flushed from chamber 16, the $As_2Te_3$ is rapidly brought to its melting point by supplying current to heater 18, such current being supplied by wires 20 from an electrical power source 22 which may suitably be the line voltage. When the $As_2Te_3$ has been melted, the pressing plate 24 on a plunger 26 is pushed down to force the $As_2Te_3$ melt to conform to the depression in backing plate 10. Plunger 26 has associated therewith bellows 28 and the travel distance of pressing plate 24 is about 1.5 inches. After pressing plate 24 has been pressed down on the $As_2Te_3$, electric power is removed from heater 18. Heater 18 is subjected to a flow of water therethrough, such water being provided through cooling coils 30 which are suitably connected to a cold water source not shown. Preferably, the $As_2Te_3$ is heated to the melting point and cooled rapidly to minimize the loss of arsenic from the melt.

Cold Press Method

The $As_2Te_3$ ingot, prepared in a fused quartz ampule as previously described, is crushed to a coarse powder (60 mesh U.S. Standard Sieve size being suitable) and loaded into a stainless steel backing plate. The powder is then compressed, suitably on a hydraulic press with about 10,000 psi. The powder is compressed, densified and forced into the depression in the backing plate. A result which may occur from the cold press method is that $As_2Te_3$ may not be well bonded to the backing plate. To overcome this possibility, prior to using the $As_2Te_3$ made this way as a source, it can be heated briefly to the melting point to effect bonding and uniform thermal contact between it and the backing plate.

Melt Casting Method

Figure 2:
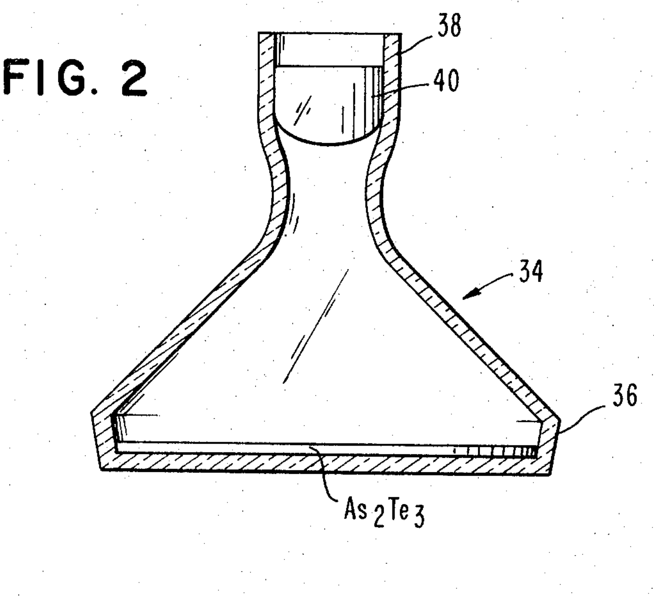
FIG. 2 is an illustration of another apparatus for preparing a sublimation source.

A mixture of 40 atomic percent of As and 60 atomic percent of Te is placed in a flat-bottomed quartz vessel 34 as shown in FIG. 2. This vessel preferably has a tapered wall 36 near its base. With the As and the Te in vessel 34, it is evacuated and sealed by heating its neck 38 until neck 38 softens and collapses against and fuses to the sealing plug tube 40. Sealed vessel 34 is then placed in a resistance heated furnace and heated to about 500°C whereupon it is removed from the furnace and placed on a flat, level surface so that the $As_2Te_3$ formed during the heating freezes to a thin disk shaped ingot at the bottom of chamber 34, the ingot taking on the peripheral contour of tapered wall 36. After the solidifying of the $As_2Te_3$, vessel 36 is scribed around the upper perimeter of tapered wall 36, such scribing suitably being effected with a tungsten carbide point, and the vessel is cracked open to free the disk shaped ingot. The latter ingot is placed in a stainless steel backing plate with the flat side against the backing plate for uniform thermal contact. The ingot is bonded to the backing plate by heating it briefly to the melting point as was done in the cold press method described hereinabove.

Deposition Rate vs 1/T Relationship

Prior to describing the use of the source as formed hereinabove to coat a substrate, there is explained the relationship between the rate of deposition and substrate temperature. In this connection, it is known that in some chemical systems, there exists a relationship between the rate of deposition and the substrate temperature which determines the crystalline state of the deposited film. Such relationship is described in the publication of M. H. Francombe and J. E. Johnson, Physics of Thin Films, Vol. 5 (1969), Academic Press, pp. 196–203 and in the book Thin Films Handbook, Maisel and Glang.

Figure 3:
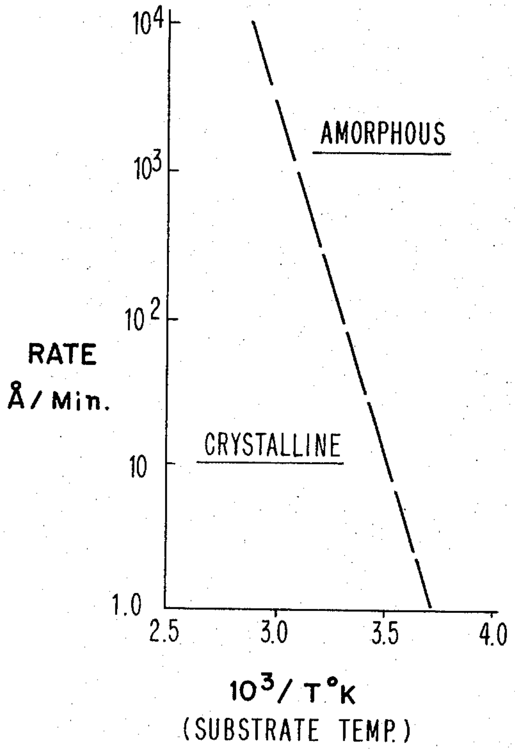
FIG. 3 is a semi-logarithmic plot which illustrates the conditions of the rate of deposition vs reciprocal substrate temperature needed to produce amorphous films in the case of $As_2Te_3$.

In FIG. 3 there is shown a semilogarithmic plot which illustrates the rate of deposition vs reciprocal temperature in the case of $As_2Te_3$. In FIG. 3, the abscissa is $10^3/T°K$, wherein T°K is the substrate temperature and the ordinates are the deposition rate in A/min. on a logarithmic scale. The broken line in FIG. 3 represents the boundary between conditions which produce amorphous films and conditions which produce crystalline films. FIG. 3 illustrates that, for the deposition of amorphous films onto substrates which are maintained at room temperature, a deposition rate of about 100A/min. is required.

Such rate-temperature relationship places a constraint on the geometry of a system for the sublimation deposition of an amorphous material. The latter system has to be designed to provide a sufficient deposition rate and, the substrate temperature has to be maintained below a critical value for that deposition rate. The first consideration is the rate of evaporation from the source since this establishes an upper limit for the deposition rate. The evaporation rate can be estimated utilizing the equation: $R = (3.513 \times 10^{22})\ \alpha\ P/(MT)^{1/2}$, as discussed in the above referred to Francombe and Johnson publication.

Figure 4:
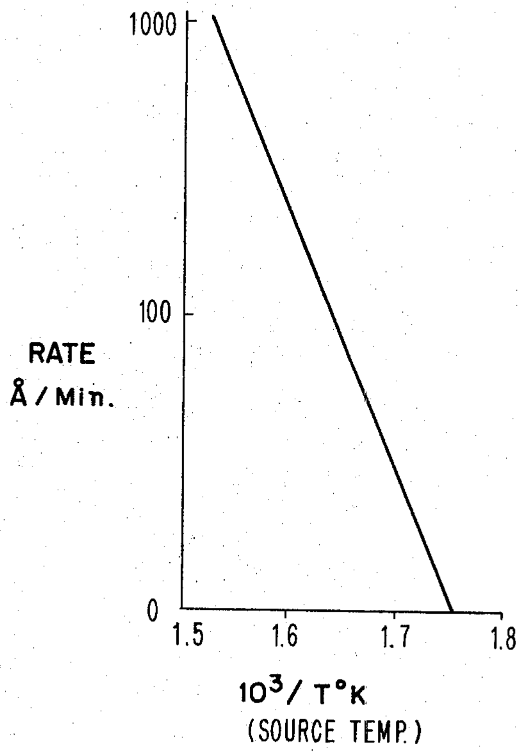
FIG. 4 is a semi-logarithmic plot of deposition rate vs reciprocal source temperature and illustrates the case wherein the area of the source is at least equal to that of the substrate and wherein the source to substrate distance is about equal to the radius of the source (wherein the source is a substantially circular disk)

In the above equation, $\alpha$ is the evaporation coefficient which is unity for an atomically clean surface, P is the vapor pressure of the substance at the temperature, T, of the source, and M is the molecular weight of the evaporating substance. The term R is the evaporation rate in atoms/$cm^2$ sec. The source temperature has to be less than the melting temperature in order to obtain the advantage of a steady state vapor composition from a sublimation source. The vapor pressure, P, is, in general, temperature dependent in an exponential manner of the form $P = Ae^{-H_V/kT}$. The deposition rate, R, which is proportional to the vapor pressure, P, is shown to have this exponential dependence in FIG. 4 for $As_2Te_3$. In FIG. 4, the abscissa is $10^3/T°K$ wherein T°K is the source temperature and the ordinates are the deposition rates in A/min on a logarithmic scale. Therefore, the highest deposition rate is obtained from a sublimation source which is operated as close as possible to the melting point. Such operation necessitates that the source be uniformly heated both laterally and vertically. A source geometry which satisfies this condition is a thin flat plate that is uniformly heated on one face thereof.

The rate of deposition on the substrate depends upon the fraction of the evaporation flux which reaches the substrate. The deposition rate is, therefore, a function of the source to substrate distance and of the relative areas of the source and the substrate. Ideally, if the source-substrate distance can be made sufficiently small, then the entire flux from the source is captured. However, the substrate has to be maintained at a much lower temperature than the source in order to obtain an amorphous film and in addition the obtaining of an amorphous film is difficult to effect when the source is too close to the substrate. Consequently, a geometry which provides efficient capture of the evaporation flux from the source and therefore high deposition rates without subjecting the substrate to a heat which would cause crystallinity rather than amorphousness consists of a source having a surface area which is greater than or at least equal to the area of the substrate and with a source to substrate distance which is approximately equal to the radius of the source. Where the source is not in the form of a circular disc, a suitable spacing distance is about ½ of the shortest dimension of the source.

The deposition rate of $As_2Te_3$ as a function of source temperature for the geometry wherein the source area is at least equal to that of the substrate and wherein the source to substrate distance is approximately equal to the radius of the source is shown in FIG. 4. The example is one wherein the $As_2Te_3$ source has a diameter of 6 cms and the source to substrate distance is 3 cm. The substrate also has a diameter of 6 cm. FIG. 4 shows deposition rates as high as 1,000A/min can be obtained without exceeding the melting point of the compound. FIG. 3 indicates that such a relatively high deposition rate is eminently suitable for producing amorphous films on substrates which are maintained at room temperature.

There now follows hereinbelow a description of an example of sublimation deposition according to the invention. In this example, the compound $As_2Te_3$ is prepared by melting a stoichiometric mixture of As and Te in a sealed, evacuated quartz ampule. The resulting $As_2Te_3$ ingot is crushed and melt-pressed into a stainless steel backing plate. With the $As_2Te_3$ so melt-pressed into the steel backing plate, the apparatus used for carrying out the sublimation deposition is as schematically shown in plan view in FIG. 5 and in side elevation in FIG. 6.

Figure 5:
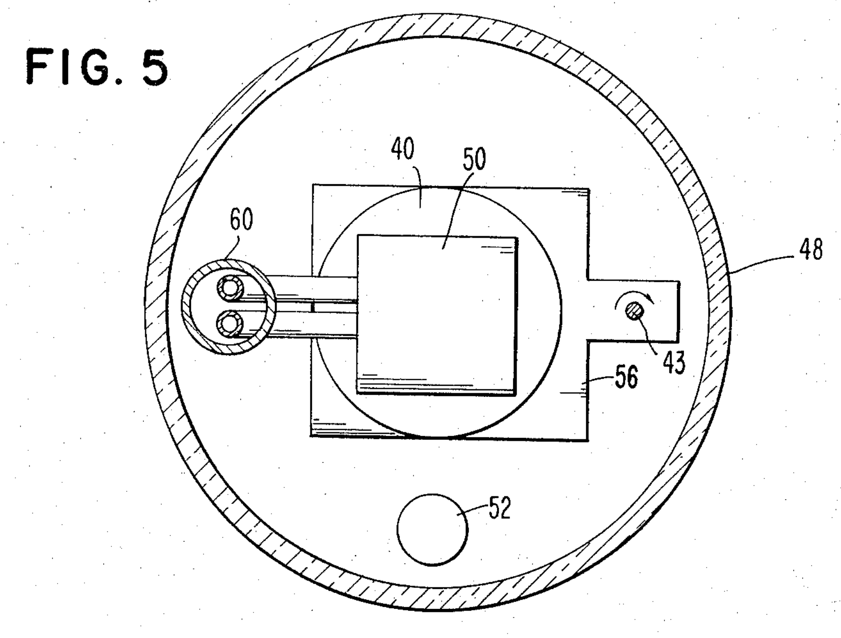
FIG. 5 is a plan view of a schematic depiction of an apparatus suitable for use in carrying out the method according to the invention.
Figure 6:
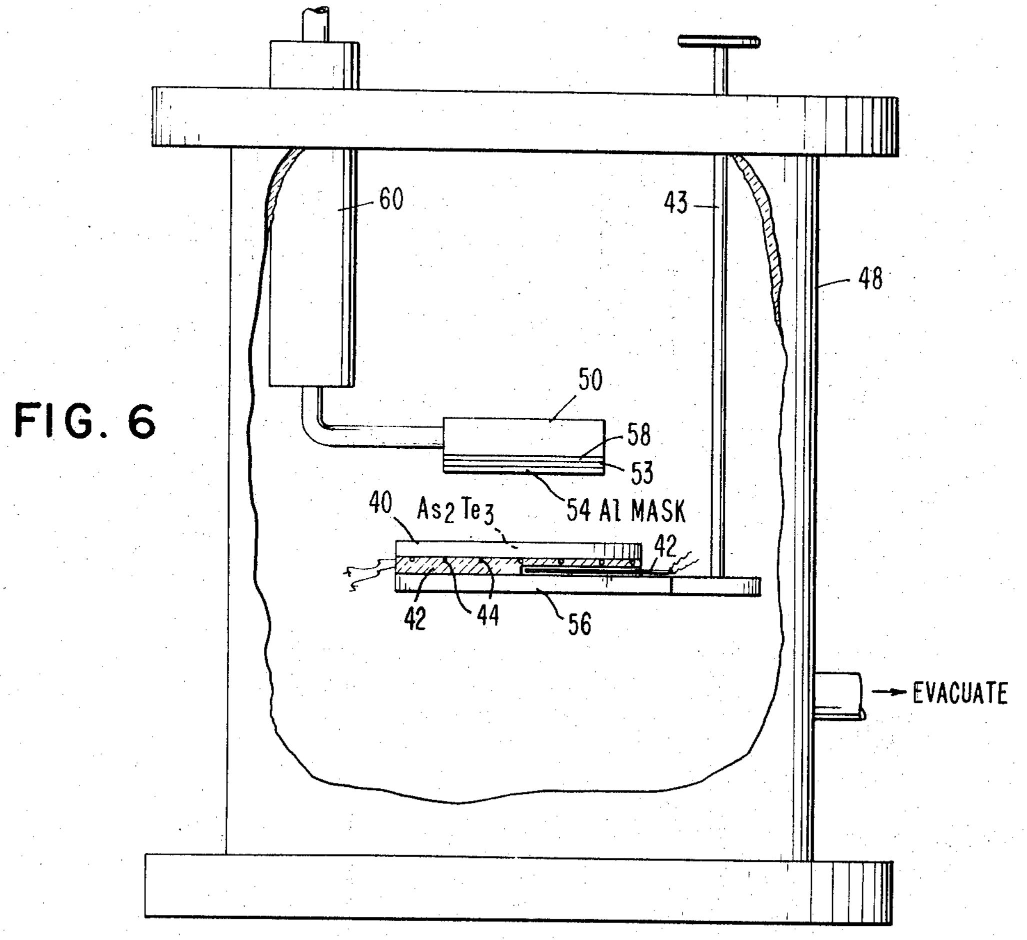
FIG. 6 is an elevational view, partly cut away, of the apparatus shown in plan view in FIG. 5.

In the apparatus shown in FIGS. 5 and 6, the backing plate 40 containing the $As_2Te_3$ is clamped on to a stainless steel heater block 42, heater block 42 suitably being provided with slots to accommodate a winding of sheathed, electrically insulated heater wire. A suitable thermocouple 46, such as one of the chromelalumel type is positioned in heater block 42 to enable the monitoring of the temperature of the source, i.e., steel backing plate 40 containing the $As_2Te_3$. Source 40 on heater block 42 is suitably supported in an evacuable bell jar 48 on a rotatable support 56 which rotates on shaft 43 such that it can be positioned either under a deposition rate monitor 52 or under a water cooled copper block 50 which serves both as a substrate support and heat sink. Since support mechanisms are well known, further description and depiction of the support for source 40 is deemed unnecessary.

The substrate 53 is suitably a polished fused quartz disk of one inch radius and 10 mils thick. Substrate 53 is in contact with a 2 inches × 2 inches square copper block 50. On the surface of substrate 53 in contact with block 50 is a thin film layer of liquid gallium 58, the liquid gallium film providing uniform thermal contact between substrate 53 and block 50. On the surface of substrate 53 facing source 40, there is provided an aluminum mask 54 in order to obtain the desired pattern of $As_2Te_3$ on substrate 53. Suitably, aluminum mask 54 and substrate 53 are clamped into position by means of a copper frame, 2 inches × 2 inches, with a 0.9 inch diameter central opening therethrough, whereby the portion of the substrate to be coated can be exposed to the evaporation flux from source 40. Source 40 is 6 cm in diameter and is disposed about 3 cm from substrate 53.

In carrying out the process, the apparatus shown in FIGS. 5 and 6 is assembled with source 40 positioned under rate monitor 52. Bell jar 48 is evacuated to a pressure of $10^{-6}$ Torr. The source, i.e., the $As_2Te_3$, is heated to 370°C by supplying a current of about 2 amperes to heater wires 44 for heater 42, the electrical source for the heater wires 44 not being shown but suitably being the readily available line voltage.

In carrying out this process, when the source attains a temperature of 370°C, the rate monitor indicates deposition rate of about 100A/min. At this juncture, cooling water is supplied to the substrate by providing water from inlet 60 which is connected to a cold water source (not shown) to the substrate cooling block 56. A sort period thereafter, i.e., about 5 minutes after the water flow is initiated, source 40 is positioned in registration with substrate 53 and the deposition of amorphous $As_2Te_3$ film is initiated. Assuming that a 600A film is desired, the source is held in the deposition position for about 6 minutes, at which time it is repositioned under the deposition monitor. At this point, the current supply to heater 42 is removed and the whole system is permitted to cool to room temperature before bell jar 48 is bled to normal atmospheric pressure.

The sample so deposited, upon analysis by an electron microprobe method, is found to contain 28 weight percent As and 72 weight percent Te with an accuracy of ±5 percent and a precision of ±3 percent (~95 percent confidence level). This composition corresponds to stoichiometric $As_2Te_3$.

Films of $As_2Te_3$, prepared in this manner, have been shown to be amorphous by electron diffraction methods. The films have electrical resistivity values similar in magnitude to those of bulk amorphous $As_2Te_3$. When heated to about 150°C, the films crystallize in an exothermic transformation. After the crystallization, the films have the low electrical resistivity characteristic of crystalline $As_2Te_3$. All of these tests show that the films are amorphous.

In considering the above described technique according to the invention, it is to be noted that, in order to obtain a film in the amorphous state by the condensing of vapor, it is essential that the deposition rate exceed a critical value for a given substance and a given substrate temperature. Thus, the inventive technique is applicable to the deposition of materials with appreciable vapor pressures at or below their melting points. Furthermore, a high deposition rate is advantageous for the production of high purity films because the deposition rate is of necessity substantially greater than that of the impingement rate of the residual gases in the evacuated atmosphere.

Accordingly, these considerations set a practical lower limit for the vapor pressure of a substance to be deposited in the amorphous state by the sublimation method according to the invention. Thus, considering a quantity of $3 \times 10^{14}$ atoms/min (about 10A/min) as a practicable deposition rate, the following evaporation rate equation can be applied to determine the minimum value of the ratio of $P$ to $(MT_m)^{1/2}$.

$$R = (3.513 \times 10^{22})\ \alpha\ P/(MT_m)^{1/2}$$

where $\alpha$ is the evaporation coefficient which is unity for an atomically clean surface, $T_m$ is the melting point of the source in degrees Kelvin, and $P$ is the vapor pressure of source at temperature $T_m$.

It is inherent in the nature of the steady state condition of the operating sublimation source that the surface of the source becomes enriched in the lowest vapor pressure constituent. After the source achieves the steady state, the rates of evaporation of the higher vapor pressure constituents become dependent upon the rate of evaporation of the lowest vapor pressure constituent. The vapor pressure, P, calculated by the above set forth equation, is the vapor pressure of the lowest vapor pressure constituent. Thus, for example, the compounds and alloys of As and Te can be deposited as amorphous thin films by the sublimation method according to the invention, but Ge-Te-As alloys cannot so be deposited.

To investigate the latter phenomenon, an alloy consisting of 80 atomic percent Te, 15 atomic percent Ge and 5 atomic percent As was prepared as a sublimation source by the melt press method described hereinabove. This source was then heated to successively higher temperatures and the deposition rate was monitored. Such deposition rate was less than $10^{14}$ atoms/$cm^2$-sec in the steady state condition at all temperatures below the solidus temperature of this alloy.

A relatively high rate of deposition was obtained above the solidus temperature when the source consisted of a mixture of solid and liquid phases, but the vapor composition varied with time thus showing that it was not operating as a steady state source at a fixed vapor composition.

In order to prepare multi-component amorphous chalcogenide films containing low vapor pressure elements such as e.g., Ge, Si, Cu, Ag, and the like, it is necessary to employ "two-source" evaporation. The sublimation source can be used to advantage in two-source evaporation because it provides a constant composition vapor at a steady rate. To prepare Ge-Te-As amorphous alloys, for example, the Te and As can be provided in a fixed atomic ratio from a sublimation source. The Ge is codeposited from a resistance heated boat source.

As an example of the preparation of a Ge-Te-As amorphous alloy, an alloy consisting of 95 percent Te and 5 percent As was fabricated into a sublimation source by the hereinabove described melt press method. The Ge was evaporated from a tungsten boat positioned immediately adjacent to the sublimation source. The concentration of Ge in the film was adjusted as follows. The sublimation source was heated to its operating temperature (350°C) and the deposition rate, $R_{(Te+As)}$, was determined by means of a quartz crystal rate monitor. The Ge source was heated to its melting point and then the temperature was slowly increased. The total deposition rate, $R_T = R_{(Te+As)} + R_{Ge}$ was continuously monitored and the Ge deposition rate, $R_{Ge}$, was determined by taking the difference $R_T - R_{(Te+As)}$. Since the deposition rate as measured by a quartz crystal monitor is a mass rate in grams/cm$^2$-sec, the weight percent of Ge in the vapor stream is given by:

$$\text{wt percent } Ge = R_{Ge}/R_{Te+As} + R_{Ge} \times 100 = R_T - R_{(Te+As)}/R_T \times 100$$

The desired deposition rate ratio can be obtained by adjusting the temperature of the Ge source. To correctly ascertain such rate, it is convenient to display the output of the crystal monitor on a time base recorder whereby the deposition rate is given by the slope of the output curve. Once the sublimation rate $R_{(Te+As)}$ has been determined, the deposition rate for a given weight percent of Ge can be calculated and the slope corresponding to the total rate $R_{(Te+As)} + R_{Ge}$ can be calculated and displayed on the chart. The temperature of the Ge source is then adjusted until the observed rate (slope) matches the calculated slope.

The advantages of the sublimation source in two-source evaporation are its rate and composition stability which make it possible to accurately adjust the relative rates. When the rate ratio has the desired value, the shutter is opened and the vapor stream is permitted to condense on the substrates.

Two-source evaporation using two sublimation sources is applicable to quaternary alloys such as Ge-Si-Te-As. An alloy consisting of equal atomic fractions of Ge and Si can be used for one sublimation source and an alloy of 95 atomic percent Te and 5 atomic percent As can be used as the other sublimation source. The Ge-Si source is heated to approximately 1,000°C and the Te-As alloy source is heated to 350°C. The sources should be disposed in close proximity so that their vapor streams both impinge upon the substrate.

Once a steady state vapor composition is achieved, a film of that composition is obtained if (1) the sticking coefficient of all the constituents is unity and (2) there are no secondary sources in the system. The sticking coefficient is defined as the ratio of the number of atoms impinging/number of atoms sticking, and is a function of the substrate temperature. It becomes unity for all solid elements at cryogenic temperatures. Certain elements such as As, Sb, Bi, and Se have sticking coefficients which are less than unity in the vicinity of room temperature. Thus, compositions such as AsTe are advantageously deposited on substrates which are cooled below room temperature to insure that the arsenic sticks.

The term "secondary source" is defined as a surface on which the vapor stream impinges which has a temperature such that the sticking coefficient of one or more of the constituents is less than unity. The non-sticking constituent, such as As for example, can bounce off the secondary source and become incorporated in excess in the film where it will stick because of the low substrate temperature and associated high sticking probability. Secondary sources can be eliminated by permitting the vapor stream to impinge only on surfaces cooled to the same temperature as the substrate. Such state can be obtained by providing a small source to substrate distance (less than the diameter of the source) and a uniformly cooled substrate support plate having an area greater than the area of the source.

In Tables 1 and 2 hereinbelow there are indicated results of single source and two-source evaporation utilizing the technique according to the invention. The single source which is employed is a thin disc of the desired semiconductor material having a radius of about 3 cms. The substrate and source areas are about equal. With regard to the $As_2Te_3$ source, it has been determined that it should be heated to a temperature in the range of 300° to 400°C. The substrate temperature should be maintained at one no greater than 25°C. The pressure in the sublimation chamber desirably is no greater than $5 \times 10^{-6}$ Torr.

TABLE 1

| Source Composition | Source Temp C° | Substrate Temp C° | °Rate A/min | Pressure Torr | Source-Substrate Dist. cm | Product Film |
|---|---|---|---|---|---|---|
| $As_2Te_3$ | 282°C | 10°C | 2.0 | $2 \times 10^{-6}$ | 3 cm | Crystalline $As_2Te_3$ |
| $As_2Te_3$ | 350°C | 10°C | 118 | $2 \times 10^{-6}$ | 3 cm | Amorphous $As_2Te_3$ |
| $As_2Te_3$ | 365°C | 18°C | 269 | $2 \times 10^{-6}$ | 3 cm | Amorphous $As_2Te_3$ |
| $As_2Te_3$ | 380°C | 18°C | 590 | $2 \times 10^{-6}$ | 3 cm | Amorphous $As_2Te_3$ |

TABLE 2

TWO SOURCE EVAPORATION RUNS

| Source Composition atom % | Source Temp | Substrate Temp | Rate Total | Pressure Torr | Second Source | Product Film atom % |
|---|---|---|---|---|---|---|
| Te 95, As 5 | 334°C | 10°C | 100 | $2 \times 10^{-7}$ | Ge | Te 86, As 8, Ge 6 |
| Te 95, As 5 | 357°C | 20°C | 170 | $4.8 \times 10^{-7}$ | Ge | Te 93, As 5, Ge 2 |

It has been found that where there is used a first source comprising 95 atomic percent Te and 5 atomic percent As, and a second source comprising germanium, the final amorphous thin film which is produced comprises 47.5 to 93 atomic percent of Te, 2 to 8 atomic percent of As and 2 to 50 atomic percent of Ge.

Generally, where there is utilized a first source comprising from 0 to 50 atomic percent of As and 50 to 100 atomic percent of Te, and a second source of Ge, there are produced final amorphous thin films comprising 25 to 100 atomic percent of Te, 0 to 50 atomic percent of As and 0 to 50 atomic percent of Ge.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A method for providing an amorphous as $Te_3$ semiconductor material thin film on a quartz substrate member comprising the steps of:

disposing in spaced opposing relationship in an evacuated chamber, a surface of a body of said semiconductor material which contains the components of said thin film in the desired stoichiometric proportions and which is substantially uniform in thickness and composition, said body serving as a sublimation source, and a surface of said substrate member, the distance between said surfaces being chosen to be no greater than the shortest dimension of said source surface, the area of said surface of said source being chosen to be at least equal to the area of said surface of said substrate member, said semiconductor material being one wherein the lowest vapor pressure constituent thereof has a value of at least about $0.855 \times 10^{-8}$ for the ratio $P/(MT_m)^{1/2}$ wherein P is the vapor pressure in Torr of said lowest vapor pressure constituent at a temperature less than the melting point of said semiconductor material and M is the molecular weight of said last-named constituent, and $T_m$ is the melting point of said semiconductor material; and heating said surface of said semiconductor material body to a temperature close to but less than its melting point to cause said semiconductor material to evaporate from said semiconductor material body onto said substrate surface as an amorphous film.

2. A method as defined in claim 1 wherein there is utilized as said source a disk consisting essentially of 0 to 50 atomic percent of As and 50 to 100 atomic percent of Te, and wherein in the carrying out of said method, said source is maintained at a temperature of about 300°C up to the melting point of said source, said substrate is maintained at a temperature not exceeding 25°C, and wherein the pressure in said evacuated chamber is maintained at a temperature not exceeding $5 \times 10^{-6}$ Torr.

3. A method as defined in claim 1 wherein there is utilized as said source a disk having about a 3 centimeter radius, consisting essentially of $As_2Te_3$ and wherein in the carrying out of said method, said source is maintained at a temperature of about 300°C, up to the melting point of said $As_2Te_3$, said substrate is maintained at a temperature not exceeding 25°C, wherein the pressure in said evacuated chamber is maintained at a pressure not exceeding $5 \times 10^{-6}$ Torr and wherein said distance is about three centimeters.

4. A method for providing an amorphous $As_2Te_3$ semiconductor thin film on a quartz substrate member comprising the steps of:

providing as one evaporation source, a body of those semiconductor constituents whose respective vapor pressures at temperatures below their melting points meet the criterion of at least about $0.855 \times 10^{-8}$ for the ratio $P/(MT_m)^{1/2}$ wherein P is the vapor pressure of a particular constituent, M is the molecular weight and $T_m$ is the melting point of said body, said body containing said constituents in the stoichiometric proportions desired therefor in said film, and being substantially uniform in thickness and composition;

providing as further sources, each of said semiconductor constituents whose vapor pressures at temperatures below their respective melting points do not meet said criterion;

disposing in spaced opposing relationship said sources and said substrate member, the distance between said one source and said substrate member being chosen to be no greater than the shortest dimension of said one source, the area of the surface of said one source being chosen to be at least equal to the area of the surface of said substrate member; and heating said one source to a temperature close to but less than its melting point and heating said other sources to temperatures wherein the extents of evaporations therefrom cause their deposition onto said substrate in quantities requisite to provide their desired stoichiometric proportions in said thin film.

5. A method as defined in claim 4 wherein the deposition rate of the semiconductor material from said one source is determined by the equation $$R = (3.513 \times 10^{22})\ \alpha P/(MT)^{1/2}$$

wherein $\alpha$ is the evaporation coefficient which is unity for any atomically clean surface, P is the vapor pressure for the particular semiconductor constituent of the semiconductor material constituting said one source at the temperature T of said one source, M is the molecular weight of said last-named constituent and R is the evaporation rate in atoms/cm², said vapor pressure of a constituent of said one source being determined by the expression $$P = Ae^{-Hv}/kT$$

and wherein the deposition rate of the constituent X which does not meet said vapor pressure criterion is determined by the equation $$\text{weight percent } X = R_X/R_{(A+B\ldots)}+R_X \cdot 100 = R_T - R_{(A+B\ldots)}/R_T \cdot 100$$

wherein $R_X$ is the deposition rate of said constituent X, $R_{(A+B\ldots)}$ is the deposition rate of the material from said one source and $R_T$ is the total deposition rate.

6. A method as defined in claim 5 wherein there is utilized as said one source, a disk consisting essentially of 0 to about 50 atomic percent of As, about 50 to 100 atomic percent of Te and wherein, in the carrying out of said method, said source is maintained at a temperature of about 300°C up to the melting point of said one source, said substrate is maintained at a temperature not exceeding about 25°C, wherein the pressure in said evacuated chamber is maintained at a pressure not exceeding about 5 × $10^{-6}$ Torr and wherein, there is utilized as another source, Ge, to produce an amorphous thin film on said substrate comprising about 25 to 100 atomic percent of Te, 0 to about 50 atomic percent of As, and 0 to about 50 atomic percent of Ge.

7. A method as defined in claim 5 wherein there is utilized as said one source, a disc having about a 3 centimeter radius consisting essentially of 95 atomic percent Te and 5 atomic percent As and wherein, in the carrying out of said method, said source is maintained at a temperature of about 300°C up to the melting point of said one source, said substrate is maintained at a temperature not exceeding about 25°C, wherein the pressure in said evacuated chamber is maintained at a pressure not exceeding about 5 × $10^{-6}$ Torr and wherein said distance is about 3 cm, and wherein there is utilized as another source, Ge, to produce an amorphous thin film on said substrate comprising 47.5 to 93 atomic percent of Te, 2 to 8 atomic percent of As and 2 to 50 atomic percent of germanium.

* * * * *